(12) United States Patent
Matsuyama (10) Patent No.: US 11,597,338 B2
(45) Date of Patent: Mar. 7, 2023

(54) VEHICLE CONTROL APPARATUS AND VEHICLE DISPLAY SYSTEM

(71) Applicant: DENSO CORPORATION, Kariya (JP)

(72) Inventor: Shigeo Matsuyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/453,613

(22) Filed: Nov. 4, 2021

(65) Prior Publication Data

US 2022/0055560 A1 Feb. 24, 2022

Related U.S. Application Data

(63) Continuation of application No. PCT/JP2020/007948, filed on Feb. 27, 2020.

(30) Foreign Application Priority Data

May 9, 2019 (JP) .............................. JP2019-089230

(51) Int. Cl.
*B60R 16/03* (2006.01)
*B60K 35/00* (2006.01)
*G06F 1/3206* (2019.01)
*G09G 3/20* (2006.01)

(52) U.S. Cl.
CPC .............. *B60R 16/03* (2013.01); *B60K 35/00* (2013.01); *G09G 3/20* (2013.01); *B60K 2370/155* (2019.05); *B60K 2370/182* (2019.05); *B60K 2370/52* (2019.05); *G05B 2219/23316* (2013.01); *G06F 1/3206* (2013.01); *G09G 2330/021* (2013.01); *G09G 2360/04* (2013.01); *G09G 2380/10* (2013.01)

(58) Field of Classification Search
CPC ......... B60R 16/03; B60R 16/02; B60K 35/00; B60K 2370/182; B60K 2370/52; B60K 2370/155; G09G 3/20; G09G 2330/021; G09G 2360/04; G09G 2380/10; G05B 2219/23316; G06F 1/3206
See application file for complete search history.

(56) References Cited

U.S. PATENT DOCUMENTS

| 8,933,799 B2 * | 1/2015 | Katoh ...................... B60Q 3/14 340/459 |
| 2003/0043048 A1 | 3/2003 | Wada et al. |
| 2007/0052703 A1 * | 3/2007 | Seto .......................... G06T 1/60 345/419 |
| 2007/0078598 A1 * | 4/2007 | Watanabe .......... G01C 21/3697 701/429 |

(Continued)

FOREIGN PATENT DOCUMENTS

| JP | 2003075206 A | 3/2003 |
| JP | 2004224132 A | 8/2004 |

(Continued)

*Primary Examiner* — Douglas M Wilson
(74) *Attorney, Agent, or Firm* — Harness, Dickey & Pierce, P.L.C.

(57) ABSTRACT

The vehicle control apparatus for controlling the electronic device provided in the vehicle includes: an operation state detection unit for detecting at least one operation state of the vehicle; a plurality of internal circuits provided for operating the electronic device; and an energization control unit that energizes at least one of the internal circuits determined based on the at least one operation state.

9 Claims, 3 Drawing Sheets

(56) References Cited

U.S. PATENT DOCUMENTS

| | | | |
|---|---|---|---|
| 2012/0056736 A1* | 3/2012 | Katoh | B60K 35/00 340/439 |
| 2015/0304954 A1 | 10/2015 | Korenaga et al. | |
| 2019/0210459 A1* | 7/2019 | Kojima | B60K 28/12 |
| 2020/0148144 A1 | 5/2020 | Shiomi | |

FOREIGN PATENT DOCUMENTS

| | | | |
|---|---|---|---|
| JP | 2007114035 A | 5/2007 |
| JP | 2009262832 A | 11/2009 |
| JP | 2014119925 A | 6/2014 |
| JP | 2019018844 A | 2/2019 |
| JP | 2020108198 A | 7/2020 |

* cited by examiner

OPERATION STATE IN POWER OFF STATE

| DEVICE | OPERATION STATE | WELCOME PERFORMANCE | METER SMALL DISPLAY | JUST AFTER TURNING OFF | GOODBYE PERFORMANCE |
|---|---|---|---|---|---|
| INTEGRATED ECU | DIGITAL TELEVISION PROCESSING IC | OFF | OFF | ON | OFF |
| | MAIN DISPLAY DRAWING IC | ON | OFF | ON | ON |
| | DSP | OFF | OFF | ON | ON |
| | METER DISPLAY DRAWING IC | ON | ON | ON | ON |
| MAIN DISPLAY | | ON | OFF | ON | ON |
| DOOR SPEAKER | | OFF | OFF | ON | ON |
| METER DISPLAY | | ON | ON | ON | ON |

VEHICLE CONTROL APPARATUS AND VEHICLE DISPLAY SYSTEM

CROSS REFERENCE TO RELATED APPLICATION

The present application is a continuation application of International Patent Application No. PCT/JP2020/007948 filed on Feb. 27, 2020, which designated the U.S. and claims the benefit of priority from Japanese Patent Application No. 2019-089230 filed on May 9, 2019. The entire disclosures of all of the above applications are incorporated herein by reference.

TECHNICAL FIELD

The present disclosure relates to a vehicle control apparatus and a vehicle display system.

BACKGROUND

Vehicle devices that perform various controls while reducing battery power consumption are known. When the device described in Patent Literature 1 detects that the vehicle has stopped, the device turns off a switch arranged in the power supply line between the battery and the processing device. This reduces the power consumption of the battery.

SUMMARY

According to an example, a vehicle control apparatus for controlling a electronic device provided in the vehicle includes: an operation state detection unit for detecting at least one operation state of the vehicle; a plurality of internal circuits provided for operating the electronic device; and an energization control unit that energizes at least one of the internal circuits determined based on the at least one operation state.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In a conceivable technique, the processing device is turned off when the vehicle stops. Therefore, the processing device cannot be controlled when the vehicle stops. However, even when the vehicle stops, it is necessary to control various electronic devices mounted on the vehicle. Therefore, when it becomes necessary for the control apparatus to control the electronic device while the control apparatus is turned off, it is conceivable to turn on the control apparatus.

Here, due to the fact that meters are drawn as images on display devices and the number of vehicles equipped with navigation devices is increasing, it is considered that control for a plurality of display devices is controlled by one control apparatus.

One control apparatus that controls a plurality of display devices may be likely to be required to have high performance, and a high-performance control apparatus may tend to consume a large amount of power. Therefore, there may be a difficulty that one control apparatus for controlling a plurality of display devices may consume a large amount of power. This difficulty arises as the performance of the control apparatus increases. Therefore, even if a device controlled by one control apparatus is an electronic device other than the display device, there may be a difficulty that the power consumption may increase.

The present embodiments have been made based on this circumstance, and a vehicle control apparatus and a vehicle display system are provided with reducing power consumption.

One aspect relating to a vehicle control apparatus for achieving the above object is a vehicle control apparatus for controlling an electronic device arranged in a vehicle, and the apparatus includes an operation state detection unit for detecting the operation state of the vehicle; a plurality of internal circuits provided for operating the electronic device; and an energization control unit for energizing the internal circuit selected based on the operation state.

This vehicle control apparatus detects the operation state of the vehicle, and determines the internal circuit to be energized based on the operation state. Therefore, depending on the operation state, only a part of the internal circuits among the plurality of internal circuits equipped in the vehicle control apparatus are energized. By doing so, when it is necessary to operate the electronic device controlled by the vehicle control apparatus, the power consumption of the vehicle control apparatus can be reduced, compared with the configuration in which all the internal circuits are energized regardless of the operation state of the vehicle.

Further, one aspect relating to a vehicle display system for achieving the above object is a vehicle display system including the vehicle control apparatus, a meter display, and a main display.

Figure 1:
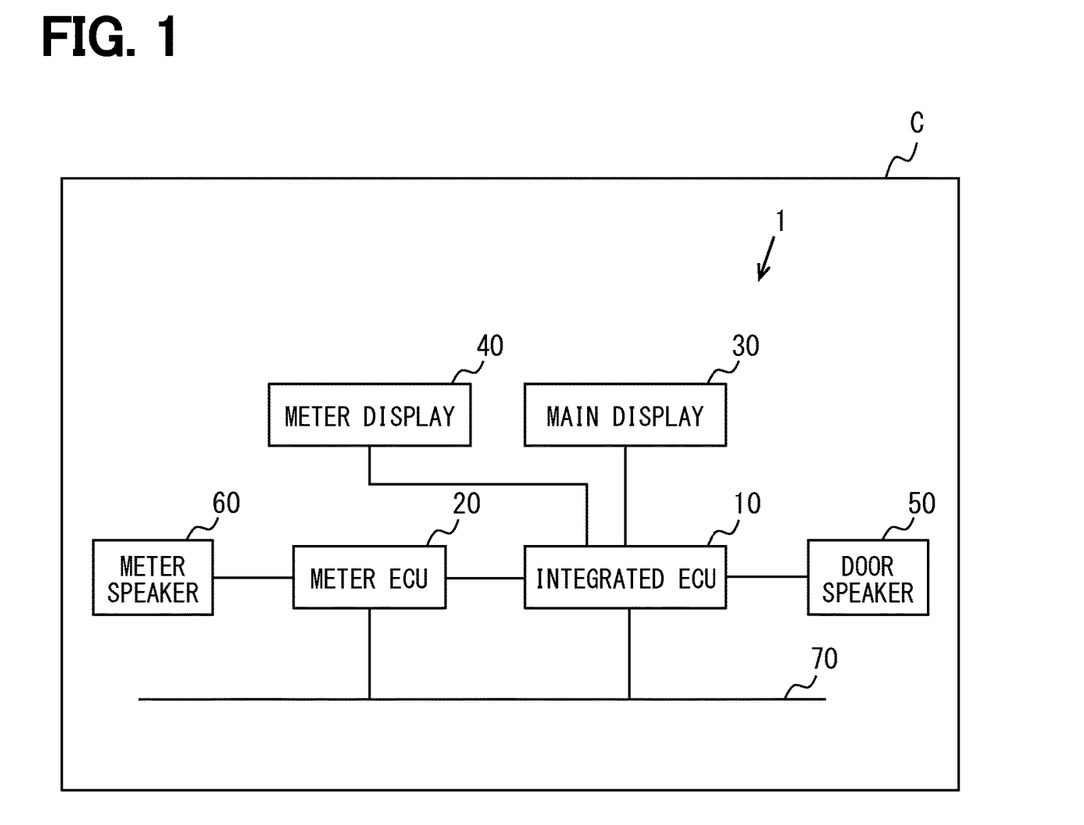
FIG. 1 is a diagram showing an overall configuration of a vehicle display system.

Hereinafter, an embodiment will be described with reference to the drawings. FIG. 1 shows the configuration of the vehicle display system 1. The vehicle display system 1 is mounted on the vehicle C. The vehicle display system 1 includes an integrated ECU 10, a meter ECU 20, a main display 30, a meter display 40, a door speaker 50, a meter speaker 60, and the like.

The integrated ECU 10 is a vehicle control apparatus, and is one ECU (Electronic Control Unit) that integrates a function of controlling the main display 30 and a function of controlling the meter display 40. Therefore, the integrated ECU 10 is connected to the main display 30 and the meter display 40, and draws various images on these display screens.

The integrated ECU 10 is also connected to the door speaker 50 and the meter ECU 20, and outputs various sounds from the door speaker 50. The integrated ECU 10 also transmits and receives mutual signals to and from the meter ECU 20. As a signal to be transmitted from the meter ECU 20 to the integrated ECU 10, there is a signal for instructing the meter display 40 to display various images. The integrated ECU 10 is connected to the in-vehicle LAN 70. The integrated ECU 10 acquires a signal indicating the operation state of the vehicle C from the in-vehicle LAN 70.

The meter ECU 20 is also connected to the in-vehicle LAN 70. The meter ECU 20 acquires information for determining whether or not to draw an image of the status indicator on the meter display 40 through a communication line such as an in-vehicle LAN 70.

The status indicator indicates the operation status of the in-vehicle device. Examples of in-vehicle devices include turn signal lights, batteries, high beam lights, door open/close sensors, and the like. When the meter ECU 20 determines that it is necessary to draw the image of the status indicator on the meter display 40, the meter ECU 20 instructs the integrated ECU 10 to draw the image of the status indicator on the meter display 40.

For example, when the left and right turn signal lights provided on the vehicle C are blinking due to the hazard switch being pressed, the meter ECU 20 instructs the integrated ECU 10 to draw the image of the indicator lights in the shape of the left and right arrows on the meter display 40. Further, when there is an abnormality in the battery, the meter ECU 20 instructs the integrated ECU 10 to draw a warning indicator light with a figure indicating the battery on the meter display 40. Further, when the door is open, the integrated ECU 10 is instructed to draw a warning indicator light of the vehicle figure in the state where the door is open on the meter display 40. In these examples, the arrow-shaped indicators and warning indicators are status indicators.

Further, the meter ECU 20 acquires information, for drawing on the meter display 40 an image showing a state quantity that continuously changes as the vehicle C travels, through a communication line such as an in-vehicle LAN 70. There is a vehicle speed as this state quantity. Other examples of state quantities include engine speed, fuel level, and the like. The meter ECU 20 instructs the integrated ECU 10 to draw an image showing this state quantity on the meter display 40.

Further, the meter ECU 20 instructs the integrated ECU 10 to display the numerical number indicating the mileage on the meter display 40. When the power state of the vehicle C indicates that the ignition turns on and the accessory turns on, the integrated ECU 10 is instructed to always display the numerical number indicating the mileage on the meter display 40. Further, even when a signal indicating that an operation for displaying the mileage has been performed is acquired under a condition that the power state of the vehicle C is off, the integrated ECU 10 is instructed to display the numerical number indicating the mileage on the meter display 40. The meter ECU 20 acquires a signal indicating that an operation for displaying the mileage has been performed via the in-vehicle LAN 70.

The meter ECU 20 instructs the integrated ECU 10 to draw an image on the meter display 40, but outputs a sound from the meter speaker 60 directly without instructing through the integrated ECU 10.

Figure 2:
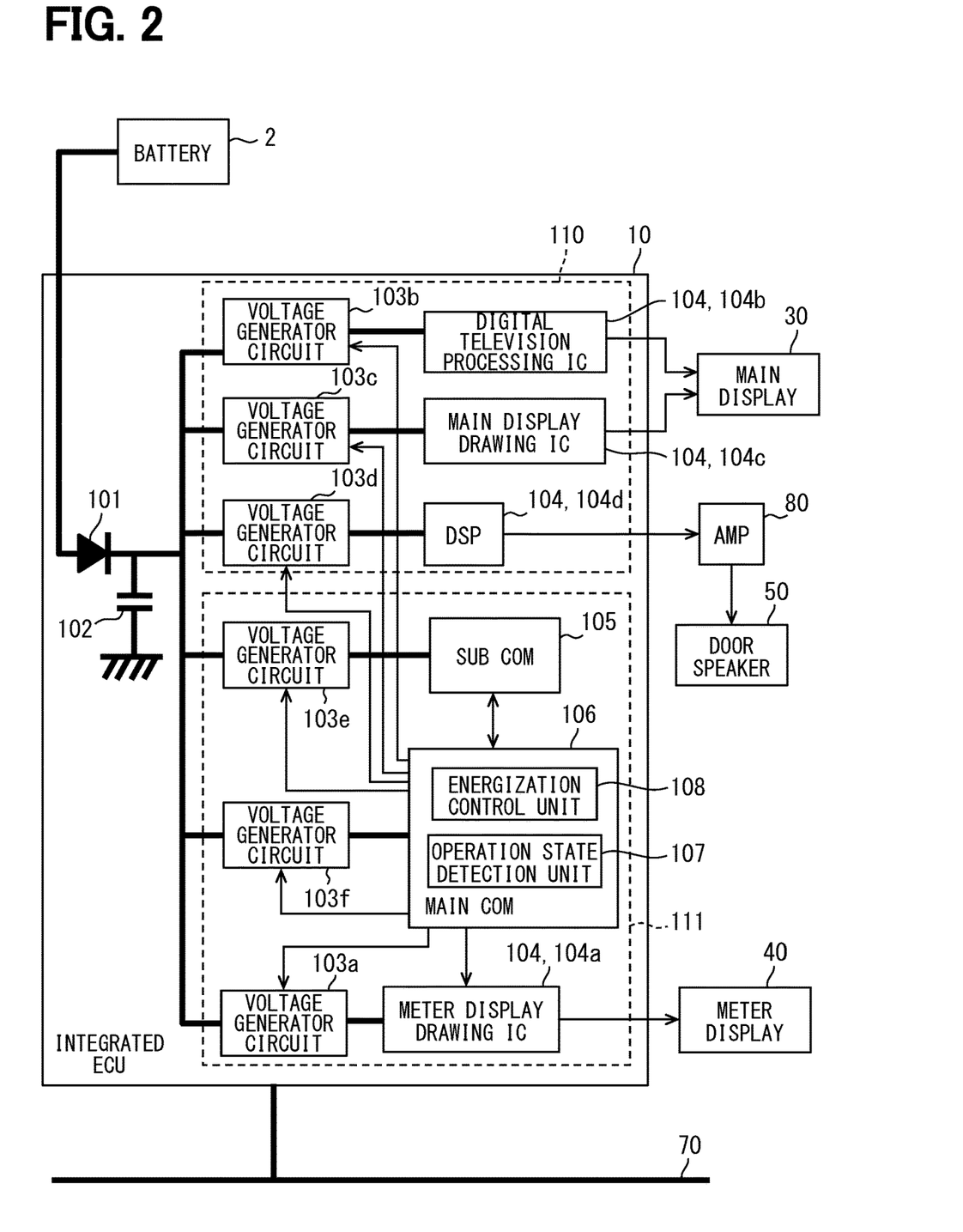
FIG. 2 is a diagram showing an internal configuration of the integrated ECU.

The main display 30 and the meter display 40 are electronic devices controlled by the integrated ECU 10. The amplifier 80 shown in FIG. 2 is also an electronic device controlled by the integrated ECU 10.

The main display 30 is a display capable of drawing various images such as a liquid crystal display and an organic EL display. The main display 30 notifies the occupants of the vehicle C of various information by displaying various images. As an example of the information displayed on the main display 30, there is information on in-vehicle audio. In addition, there is a road map as another example of the information displayed on the main display 30. The installation position of the main display 30 is, for example, the center of the dashboard of the vehicle C in the left-right direction. When the installation position of the main display 30 is the center in the left-right direction of the dashboard, the main display 30 can also be defined as a center display.

Similar to the main display 30, the meter display 40 is also a display capable of drawing various images such as a liquid crystal display and an organic EL display. The meter display 40 displays the above-mentioned state indicator light and a state amount such as the vehicle speed that continuously changes as the vehicle C travels. The display form of the state quantity may be the numerical number, a pointer, or another form. The installation position of the meter display 40 is, for example, in front of the driver on the dashboard.

The door speaker 50 is installed at or near the door of the vehicle C. The door speaker 50 is a speaker that outputs music, route guidance voice, and the like, and mainly outputs a sound linked to an image displayed on the main display 30. The installation position of the speaker that outputs the sound linked to the image displayed on the main display 30 may not be limited to the vicinity of the door. The installation position of the speaker that outputs the sound linked to the image displayed on the main display 30 may be changed to various positions in the vehicle compartment.

The meter speaker 60 is a speaker controlled by the meter ECU 20, and mainly outputs a sound linked to an image displayed on the meter display 40. The meter speaker 60 may be not mounted, and the sound output from the meter speaker 60 may be output from the door speaker 50.

The in-vehicle LAN 70 electrically connects the integrated ECU 10 and the meter ECU 20 to other devices mounted on the vehicle C. The integrated ECU 10 and the meter ECU 20 acquire the power state of the vehicle C, signals indicating that various switches have been operated, and the like via the in-vehicle LAN 70. The power state of the vehicle C includes an turn-on and off state of the ignition and an turn-on and off state of an accessory. In this embodiment, the integrated ECU 10 may be energized even when the power supply state is in an off state.

[Configuration of Integrated ECU 10]

FIG. 2 shows the internal configuration of the integrated ECU 10. The internal configuration shown in FIG. 2 is a configuration accommodated in one housing. In FIG. 2, the thick line shows the power supply path and the thin line shows the signal flow. Electric power is supplied to the integrated ECU 10 from the battery 2 mounted on the vehicle C. The integrated ECU 10 and the battery 2 are always connected by a power supply line. Therefore, the electric power from the battery 2 is supplied to the integrated ECU 10 even when the power state of the vehicle C is in an off state. Here, the integrated ECU 10 does not always have all the functions turned on when the power state of the vehicle C is in the off state. When the power supply state of the vehicle C is in the off state, the integrated ECU 10 divides the internal functions into a plurality of divided functions, and turns on and off the divided functions by turning on/off the voltage generation circuits 103a to 103f.

The electric power from the battery 2 is supplied to the voltage generation circuits 103a to 103f via a diode 101 provided for preventing backflow. The voltage generation circuits 103a to 103f are circuits that boost or step down the input voltage, change the voltage to a voltage suitable for the internal circuit 104 connected on a downstream side of each circuit, and output the voltage. Hereinafter, when the voltage generation circuits 103a to 103f are not distinguished, they are described as the voltage generation circuit 103. A capacitor 102 is connected between the diode 101 and the voltage generation circuit 103. The capacitor 102 supplies electric power when the voltage of the battery 2 temporarily drops.

Each voltage generation circuit 103 is a circuit that can be turned on and off. For example, the voltage generation circuit 103 has a configuration including a MOSFET and a driver IC, and when the driver IC turns the MOSFET on and off, the function of inputting a predetermined voltage to the circuit provided on the downstream side can be switched on and off. The driver IC is controlled by the main computer 106. In FIG. 2, for convenience of the drawings, the voltage generation circuits 103 are connected to each other in parallel. Alternatively, some voltage generation circuits 103 may be arranged in multiple stages in series. By providing a plurality of voltage generation circuits 103 in parallel, a plurality of power supply paths from the battery 2 are formed.

The integrated ECU 10 further includes a sub computer 105, a main computer 106, a meter display drawing IC 104a, a digital television processing IC 104b, a main display drawing IC 104c, a digital sound processor (hereinafter, DSP) 104d, and the like. The meter display drawing IC 104a, the digital television processing IC 104b, the main display drawing IC 104c, and the DSP 104d are internal circuits 104 for operating an electronic device outside the integrated ECU 10.

The voltage generation circuit 103a is connected to the meter display drawing IC 104a, and turns on/off the power supply to the meter display drawing IC 104a. The voltage generation circuit 103b is connected to the digital television processing IC 104b, and turns on/off the power supply to the digital television processing IC 104b. The voltage generation circuit 103c is connected to the main display drawing IC 104c, and turns on/off the power supply to the main display drawing IC 104c. The voltage generation circuit 103d is connected to the DSP 104d and turns on/off the power supply to the DSP 104d. The voltage generation circuit 103e is connected to the sub-computer 105, and turns on/off the power supply to the sub-computer 105. The voltage generation circuit 103f is connected to the main computer 106, and turns on/off the power supply to the main computer 106. The meter display drawing IC 104a, which is a meter display drawing unit, draws various images on the meter display 40. The image to be drawn includes the image of the vehicle speed. The vehicle speed can be indicated in the form in which the pointer rotates around the original point. Further, the vehicle speed may be indicated by a numerical value or by a figure other than the pointer. Further, the vehicle speed may be indicated by a combination of a numerical number and a figure other than the numerical number such as a pointer. In addition, as the figure drawn by the meter display drawing IC 104a, there are a numerical number indicating a mileage, a state indicator lamp, and the like.

The digital television processing IC 104b is an IC that performs various processes for displaying a digital television image on the main display 30. The process performed by the digital television processing IC 104b includes a process such as demodulation and decoding for extracting the video signal from the radio wave on which the video signal is superimposed.

The main display drawing IC 104c, which is the main display drawing unit, is an IC that draws an image such as a road map on the main display 30. The process performed by the main display drawing IC 104c is a process of creating graphic data to be displayed on the main display 30. The DSP 104d generates a sound signal to be output to the amplifier 80.

The digital television processing IC 104b, the main display drawing IC 104c, the DSP 104d, and the voltage generation circuits 103b, 103c, 103d connected to them are multimedia circuit units 110. On the other hand, the meter display drawing IC 104a, the sub-computer 105, and the main computer 106 are traveling system circuit units 111 that execute a part of the functions necessary for traveling the vehicle C.

The sub-computer 105 has a function of controlling the on/off of the main computer 106 and the like. The sub-computer 105 has a function of acquiring a signal from the in-vehicle LAN 70 and activating the main computer 106 when it is determined that the main computer 106 needs to be activated from the signal. The circuit unit in the sub-computer 105 that acquires the wake-up signal from the in-vehicle LAN 70 is always energized even when the power supply state is in the off state.

The main computer 106 is configured to include a processor, RAM, ROM, and the like. A program executed by the processor is stored in the ROM. By executing the above program, the main computer 106 provides the functions as the operation state detection unit 107 and the energization control unit 108. Here, the medium in which this program is stored may not be limited to the ROM included in the main computer 106, and the program may be stored in a non-transitory tangible storage medium that can be read by the main computer 106. For example, the program may be stored in the flash memory.

The operation state detection unit 107 detects the operation state of the vehicle C. It is a state for determining which of the plurality of internal circuits 104 included in the vehicle C and detected by the operation state detection unit 107 is energized. The internal circuit 104 is a circuit internally provided in the integrated ECU 10, and is a circuit that outputs a signal to the electronic device for the purpose of controlling the electronic device controlled by the integrated ECU 10.

As electronic devices, FIG. 2 shows a main display 30, a meter display 40, and an amplifier 80. The internal circuit 104 corresponding to the main display 30 is a digital television processing IC 104b and a main display drawing IC 104c. The internal circuit 104 corresponding to the meter display 40 is the meter display drawing IC 104a. The internal circuit 104 corresponding to the amplifier 80 is the DSP 104d. The amplifier 80 may be provided in the integrated ECU 10. In this case, the amplifier 80 can also be considered as an internal circuit 104.

The operation state of the vehicle C includes the power supply state of the vehicle C. Further, there are various operation states of the vehicle C even in the same power supply state. Depending on the operation state of the vehicle C, the energization state of various electronic devices mounted on the vehicle C may differ.

The operation state detection unit 107 detects the operation state of the vehicle C from the signal supplied from the in-vehicle LAN 70. The operation state detection unit 107 may directly acquire the signal supplied from the in-vehicle LAN 70 from the in-vehicle LAN 70, or may indirectly acquire the signal via the sub-computer 105, the meter ECU 20, or the like.

Figure 3:
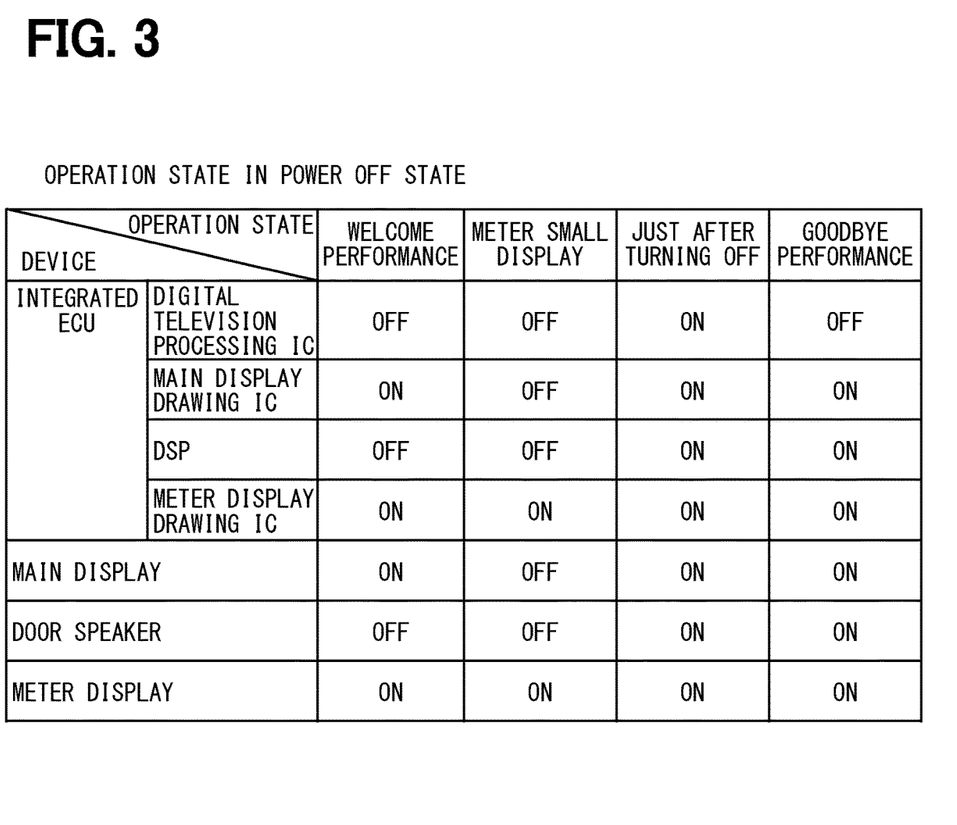
FIG. 3 is a diagram showing some operation states when the power state of the vehicle is in an off state.

FIG. 3 shows some operation states when the power state of the vehicle C is in the off state. Specifically, FIG. 3 shows a welcome performance state, a meter small display state, a state immediately after turning off, and a good-bye performance state as operation states.

The welcome performance state is an operation state when the verification of the electronic key outside of the vehicle is established and the boarding performance condition including the closing of the driver's door after the driver's door is opened is satisfied. A predetermined ECU such as a body ECU determines whether or not the boarding condition is satisfied. Then, the ECU outputs a signal instructing the execution of the welcome performance to the integrated ECU 10 using the in-vehicle LAN 70.

The meter small display state is a state in which a small image such as a status indicator lamp or a mileage is displayed on the meter display 40. The image also includes the numerical number. A predetermined ECU such as the meter ECU 20 determines whether or not it is necessary to display these small images on the meter display 40. Then, the ECU outputs an instruction to display a small image on the meter display 40 to the integrated ECU 10 together with information for specifying the small image to be displayed.

The state immediately after turning off is a state from when the power supply state is turned off until a certain time elapses. The certain time is, for example, a few minutes. A predetermined ECU such as a body ECU detects that the power supply state has been turned off. The ECU outputs to the integrated ECU 10 using the in-vehicle LAN 70 that the power supply state has been turned off.

The good-bye performance state is the operation state when the performance condition at the getting-off of the vehicle is satisfied, such as when the power state is turned off and the driver's door is opened. A predetermined ECU such as a body ECU determines whether or not the performance condition at the getting off of the vehicle is satisfied. Then, the ECU outputs a signal instructing the execution of the good-bye performance to the integrated ECU 10 using the in-vehicle LAN 70.

The energization control unit 108 determines the internal circuit 104 to be energized based on the operation state detected by the operation state detection unit 107. Then, the voltage generation circuit 103 corresponding to the determined internal circuit 104 is operated. When the power state of the vehicle C is the accessory on state and the ignition on state, the energization control unit 108 turns on all the internal circuits 104. On the other hand, when the power state of the vehicle C is in the off state, the energization control unit 108 determines the internal circuit 104 to be energized based on the detailed operation state.

FIG. 3 shows an internal circuit 104 that energizes in each of the above-mentioned operation states, and an electronic device that is disposed outside the integrated ECU 10. The internal circuits 104 that are energized in the welcome performance state are the main display drawing IC 104*c* and the meter display drawing IC 104*a*. Therefore, the main display 30 and the meter display 40, which are electronic devices controlled by them, are turned on. On the other hand, in the welcome performance state, the digital television processing IC 104*b* and DSP 104*d* of the internal circuits 104 are off.

The meter display drawing IC 104*a* is the only internal circuit 104 that is energized in the meter small display state. Therefore, in the meter small display state, the meter display 40 is turned on, but the main display 30 and the door speaker 50 are turned off.

In the state just after turning off, the energization control unit 108 energizes all the internal circuits 104. Just after the power state is in the off state, all the internal circuits 104 are energized in consideration of the possibility that the occupant may remain in the vehicle and perform various operations. In the good-bye performance state, the energization control unit 108 turns off the digital television processing IC 104*b* and turns on the other internal circuits 104.

In the present embodiment, although the power supply state of the vehicle C is in the off state, when it does not correspond to the operation state shown in FIG. 3, the energization control unit 108 turns off all the internal circuits 104.

The vehicle display system 1 of the present embodiment includes a main display 30 and a meter display 40, and one integrated ECU 10 performs a drawing process for these two displays. Since the main display 30 and the meter display 40 are both displays for drawing images, one integrated ECU 10 performs the drawing process for these two displays, as compared with the case where separate ECUs perform the drawing process for these two displays, so that the cost can be reduced.

When one integrated ECU 10 performs the drawing process on these two displays, there may be a concern that the power consumption of the integrated ECU 10 would increase. However, the integrated ECU 10 of the present embodiment includes an operation state detection unit 107. The operation state detection unit 107 detects the operation state of the vehicle C. When the power supply state of the vehicle C is in the off state, the energization control unit 108 determines the internal circuit 104 to be energized based on the detailed operation state shown in FIG. 3. Depending on the operation state, only a part of the internal circuits 104 will be energized. Therefore, the power consumption of the integrated ECU 10 can be reduced as compared with the configuration in which all the internal circuits 104 are energized regardless of the operation state.

Further, when a part of the internal circuits 104 are energized, it means that only a part of the electronic devices controlled by the integrated ECU 10 are turned on. As the vehicle display system 1, in addition to being able to reduce the power consumption of the integrated ECU 10, the power consumption can also be reduced by turning on only a part of the electronic devices.

More specifically, there are the following features in which the power consumption can be reduced. When all the functions of the integrated ECU 10 are energized in order to display the status indicator lamp on the meter display 40, the power consumption of the integrated ECU 10 consumed for displaying a small display image on the meter display 40 increases. Further, when the main display 30 on which the status indicator light is not displayed is turned on, the power consumption will be further increased. As a result, when the power state of the vehicle C is in the off state, there may be a concern that the battery will run out.

However, in the present embodiment, when the state indicator lamp is displayed on the meter display 40 under a condition that the power state of the vehicle C is in the off state, the integrated ECU 10 turns on the meter display drawing IC 104*a*, but turns off the main display drawing IC 104*c*. Further, when the mileage is displayed on the meter display 40 under a condition that the power state of the vehicle C is in the off state, the integrated ECU 10 turns on the meter display drawing IC 104*a*, but turns off the main display drawing IC 104*c*. By these on/off processes, it is possible to suppress the battery exhaustion when the power state of the vehicle C is in the off state.

Although the embodiment has been described above, the disclosed technology is not limited to the above-described embodiment, and the following modifications are included in the disclosed range, and various modifications can be made without departing from the gist except as described below. In the following description, elements having the same reference numerals as those used so far are the same as elements having the same reference numerals in the previous embodiments, except when specifically mentioned.

When only a part of the configuration is described, the embodiment described above can be applied to other parts of the configuration.

<Modification 1>

For example, the meter display 40 may be a head-up display. Further, the speed of the vehicle C may be indicated by a mechanical pointer, and one or both of the status indicator and the mileage may be drawn on the display screen.

<Modification 2>

The vehicle display system 1 includes a plurality of electronic devices controlled by the integrated ECU 10, such as a main display 30 and a meter display 40. Alternatively, only one electronic device may be controlled by the integrated ECU 10. For example, the electronic device controlled by the integrated ECU 10 may be only the main display 30. Even in this case, the integrated ECU 10 includes two internal circuits 104, i.e., a digital television processing IC 104b and a main display drawing IC 104c. Further, the meter display 40 may be eliminated and the image drawn on the meter display 40 may be displayed on the main display 30. In this case, the meter display drawing IC 104a controls the main display 30.

<Modification 3>

In the embodiment, when the power state of the vehicle C is in the off state, there are three operation states, in which only a part of the internal circuits 104 are energized, that are a welcome performance state, a meter small display state, and a good-bye performance state. Alternatively, there may be only one operation state in which only a part of the internal circuits 104 are energized when the power state of the vehicle C is in the off state.

<Modification 4>

The main display 30 of the embodiment displays information about audio and a map. Alternatively, the main display 30 may be a display that displays only one of the audio information and the map.

<Modification 5>

The integrated ECU 10 which is the control unit described in the present embodiments can be modified as follows. In addition, the control unit and the method described in the present disclosure may be implemented by a dedicated computer that configures a processor programmed to execute one or a plurality of functions embodied by a computer program. Alternatively, the control unit and the method described in the present disclosure may be implemented by a dedicated hardware logic circuit. Alternatively, the controller and the method described in the present disclosure may be implemented by one or more dedicated computers configured by a combination of a processor executing a computer program and one or more hardware logic circuits. Hardware logic circuits are, for example, ASICs and FPGAs.

The storage medium for the computer program is not limited to ROM, but can be stored in a computer-readable, non-transitory tangible storage medium as instructions to be executed by a computer. For example, the program may be stored in the flash memory.

The controller and the method thereof described in the present disclosure are implemented by a dedicated computer provided by configuring a processor and a memory programmed to execute one or more functions embodied by a computer program. Alternatively, the controller and the method described in the present disclosure may be implemented by a dedicated computer provided by configuring a processor with one or more dedicated hardware logic circuits. Alternatively, the controller and the method thereof described in the present disclosure are based on a combination of a processor and a memory programmed to execute one or more functions and a processor configured by one or more hardware logic circuits. It may be implemented by one or more configured dedicated computers. The computer programs may be stored, as instructions to be executed by a computer, in a tangible non-transitory computer-readable storage medium.

Here, the process of the flowchart or the flowchart described in this application includes a plurality of sections (or steps), and each section is expressed as, for example, S10. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure also encompasses various modified examples and modifications within a uniform range. In addition, various combinations and forms, and further, other combinations and forms including only one element, or more or less than these elements are also within the sprit and the scope of the present disclosure.

What is claimed is:

1. A vehicle control apparatus that controls an electronic device provided in a vehicle, the vehicle control apparatus comprising:

an operation state detection unit that detects at least one operation state of the vehicle;

a plurality of internal circuits that operate the electronic device; and an energization control unit that energizes at least one of the internal circuits, which is determined based on the at least one operation state, wherein:

the energization control unit energizes only a part of the plurality of internal circuits;

the at least one operation state includes at least one of a welcome performance state, a meter small display state, a state immediately after turning off, and a good-bye performance state;

the welcome performance state is an operation state in which a verification of an electronic key outside of the vehicle is established and a boarding performance condition, including a closing of a driver's door after the driver's door is opened, is satisfied;

the meter small display state is an operation state in which a small image, such as a status indicator lamp or a mileage, is displayed on a meter display;

the state immediately after turning off is an operation state from when a power supply state is turned off until a certain time elapses;

the good-bye performance state is an operation state in which a performance condition at a getting-off of the vehicle is satisfied, the performance condition including a condition where the power supply state is turned off and the driver's door is opened;

the electronic device includes the meter display and a main display that displays at least one of audio-related information and a map;

the meter display and the main display are independent from each other;

the main display is in an on state in at least one of the welcome performance state, the state immediately after turning off and the good-bye performance state; and the main display is in an off state in the meter small display state.

2. The vehicle control apparatus according to claim 1, wherein:
the at least one operation state of the vehicle includes a plurality of operation states;
the operation state detection unit detects the plurality of operation states in a state where a power state of the vehicle is in an off state; and
the energization control unit energizes only a part of the internal circuits in at least an other operation state in the state where the power state of the vehicle is in the off state.

3. The vehicle control apparatus according to claim 2, wherein:
the electronic device includes:
the meter display that draws an image of a state amount that continuously changes as the vehicle travels and an image of a state indicator light indicating the operation state of an in-vehicle device; and a main display that displays at least one of audio-related information and a map;
the internal circuits includes: a meter display drawing unit for drawing an image on the meter display; and a main display drawing unit for drawing an image on the main display;
the operation state detection unit detects one of the operation state for displaying the status indicator light when the power state of the vehicle is in the off state; and
when the operation state detection unit detects the one of the operation states for displaying the status indicator light under a condition that the power state of the vehicle is in the off state, the energization control unit does not energize the main display drawing unit, but energizes the meter display drawing unit.

4. The vehicle control apparatus according to claim 2, wherein:
the meter display displays an image of a mileage and an image of a state amount different from the mileage and continuously changes as the vehicle travels;
the plurality of internal circuits include: a meter display drawing unit for drawing the image on the meter display; and a main display drawing unit for drawing an image on the main display;
the operation state detection unit detects one of the operation states for displaying the mileage when the power state of the vehicle is in the off state; and
when the operation state detection unit detects the one of the operation states for displaying the mileage under a condition that the power state of the vehicle is in the off state, the energization control unit does not energize the main display drawing unit, but energizes the meter display drawing unit.

5. The vehicle control apparatus according to claim 3, wherein:
the state amount to be drawn on the meter display includes a vehicle speed.

6. A vehicle display system comprising:
the vehicle control apparatus according to claim 3;
the meter display; and
the main display.

7. The vehicle control apparatus according to claim 1, wherein the at least one operation state includes each of the welcome performance state, the meter small display state, the state immediately after turning off, and the good-bye performance state.

8. The vehicle control apparatus according to claim 1, wherein the main display is in an on state in all of the welcome performance state, the state immediately after turning off, and the good-by performance state.

9. The vehicle control apparatus according to claim 1, wherein the meter display is in an on state in all of the welcome performance state, the state immediately after turning off, and the good-by performance state.

* * * * *